United States Patent
Miyaki

(10) Patent No.: US 9,042,865 B2
(45) Date of Patent: May 26, 2015

(54) METHOD FOR DETERMINING MOBILE DEVICE PASSWORD SETTINGS BASED ON CHECK-IN INFORMATION

(75) Inventor: Ken Miyaki, San Diego, CA (US)

(73) Assignee: SONY COMPUTER ENTERTAINMENT AMERICA LLC, Foster City, CA (US)

( * ) Notice: Subject to any disclaimer, the term of this patent is extended or adjusted under 35 U.S.C. 154(b) by 345 days.

(21) Appl. No.: 13/434,536

(22) Filed: Mar. 29, 2012

(65) Prior Publication Data

US 2013/0260719 A1  Oct. 3, 2013

(51) Int. Cl.
*H04M 1/66* (2006.01)
*H04W 12/08* (2009.01)
*H04W 88/02* (2009.01)

(52) U.S. Cl.
CPC .............. *H04W 12/08* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 5,936,526 A | 8/1999 | Klein | |
| 7,257,374 B1 | 8/2007 | Creigh | |
| 7,711,335 B2 * | 5/2010 | Morris et al. | 455/133 |
| 2005/0046580 A1 * | 3/2005 | Miranda-Knapp et al. | 340/686.1 |
| 2005/0075116 A1 | 4/2005 | Laird et al. | |
| 2005/0154935 A1 | 7/2005 | Jin | |
| 2005/0193144 A1 | 9/2005 | Hassan et al. | |
| 2005/0250518 A1 | 11/2005 | Ishikawa et al. | |
| 2008/0200122 A1 | 8/2008 | Mann | |
| 2009/0027165 A1 | 1/2009 | Cristache | |
| 2009/0033459 A1 | 2/2009 | Ichihara | |
| 2009/0191892 A1 | 7/2009 | Kelley | |
| 2010/0009693 A1 | 1/2010 | Kawabata et al. | |
| 2010/0188243 A1 | 7/2010 | Tysowski et al. | |
| 2011/0141276 A1 * | 6/2011 | Borghei | 348/143 |
| 2012/0086571 A1 * | 4/2012 | Scalisi et al. | 340/539.13 |
| 2012/0150966 A1 | 6/2012 | Fan et al. | |
| 2013/0194067 A1 * | 8/2013 | Kimbrell | 340/5.54 |
| 2013/0217416 A1 * | 8/2013 | Matthews et al. | 455/456.2 |
| 2013/0273938 A1 * | 10/2013 | Ng et al. | 455/456.1 |

FOREIGN PATENT DOCUMENTS

WO  2012/019645 A1  2/2012

OTHER PUBLICATIONS

Final Office Action, mail date Mar. 7, 2013, U.S. Appl. No. 13/434,559.
Office Action, mail date Nov. 9, 2012, U.S. Appl. No. 13/434,559.
Office Action, mail date Feb. 1, 2013, U.S. Appl. No. 13/434,559.
Office Action, mail date Jun. 30, 2014, U.S. Appl. No. 13/434,481.
Office Action, mail date Jul. 28, 2014, U.S. Appl. No. 13/434,559.

* cited by examiner

*Primary Examiner* — Rafael Pérez-Gutiérrez
*Assistant Examiner* — Keith Fang
(74) *Attorney, Agent, or Firm* — Kilpatrick Townsend & Stockton LLP

(57) ABSTRACT

Methods, devices, and systems are disclosed for altering a mobile electronic device's screen timeout based on a check-in of a mobile device at a venue. A ringtone can be altered in addition to the password timeout time. Nearby venues and/or locations may be recognized and the time out can be adjusted based on the determined risk which may include the crime risk.

20 Claims, 11 Drawing Sheets

METHOD FOR DETERMINING MOBILE DEVICE PASSWORD SETTINGS BASED ON CHECK-IN INFORMATION

CROSS-REFERENCES TO RELATED APPLICATIONS

This application is related to and incorporates by reference for all purposes the full disclosure of co-pending U.S. patent application Ser. No. 13/434,481, filed concurrently herewith, entitled "METHOD FOR DETERMINING MOBILE DEVICE PASSWORD SETTINGS BASED ON WIRELESS SIGNAL INFORMATION"; co-pending U.S. patent application Ser. No. 13/434,501, filed concurrently herewith, entitled "METHOD FOR DETERMINING MOBILE DEVICE PASSWORD SETTINGS BASED ON WIRELESS SIGNALS"; and co-pending U.S. patent application Ser. No. 13/434,559,filed concurrently herewith, entitled "METHOD FOR DETERMINING MOBILE DEVICE PASSWORD SETTINGS BASED ON ACCELERATION INFORMATION".

BACKGROUND

1. Field of the Invention

In general, embodiments of the present invention relate to information security in mobile electronic devices and, in particular, to adjusting screen timeouts of mobile devices based on RF and other measurements of and/or at their locations.

2. Description of the Related Art

Computing devices have gotten more powerful, more portable, and more intuitive to use. Corporations and consumers alike have adopted high-tech devices in their businesses and personal lives. Many have come to rely heavily on their portable computing devices, such as smart phones, personal data assistants (PDAs), laptop computers, etc.

As the digital age progresses, some have come to recognize that a computing device itself is often no longer the most important asset to an individual or company, but rather that the data stored on the device is the most important asset. The information often carries a value many times the physical device. To illustrate the value of data over the physical hardware, we note that forward-looking businesses frequently use whole disk encryption and basic input/output system (BIOS)-level passwords to achieve such goals.

Portable and mobile devices, especially work- and business-related devices, often contain sensitive information. A password with a timeout is commonly used to prevent a lost or stolen smart phone or other electronic device from leaking such data. After the device is 'idle' for a defined timeout period, the system locks itself down. Further interaction with the device often requires password entry.

Frequent entering of passwords after a device lock-down is generally viewed by users as a nuisance, albeit a necessary one to protect information on their devices. Users generally prefer the timeout intervals to be relatively long so that they do not have to enter passwords as often.

Information Technology (IT) department policies of businesses often require that the timeout intervals be relatively short for the devices that the IT department services. This reduces the risk that an unauthorized user, such as a thief, could get access to data on a mobile device or enter the company's computers through the device.

In setting timeout periods for devices, an IT department should weigh the risks of theft and unauthorized entry with the convenience and usability of its devices. Some users have relatively little access to company data through their devices and therefore need less protection. These users may be rather numerous, so the opportunity for loss or theft may be great. Some users have relatively unimpeded access to company data through their devices and therefore need more protection. Although, these users may be few. Many IT department policies call for a standard, minimum timeout interval (e.g., 5 minutes) on certain devices; some IT departments set different intervals depending on the roles of the users.

Some have attempted to tackle the problem of password-inconvenience by making the entry of a password or other authentication as streamlined as possible. For example, devices that incorporate fingerprint readers or other biometric readers can sometimes be faster at authenticating a user than a traditional password entry. However, these systems often require extra hardware. They are not foolproof, and they sometimes have a backup password entry system in case the special hardware breaks or a person's biometric is corrupted (e.g., a cut on a finger).

There is a need in the art for more convenience involving password-protected timeouts.

BRIEF SUMMARY

Methods, devices, and systems are disclosed for altering a mobile electronic device's screen timeout interval based on measurements at or of a location of the mobile device. A number of distinct, ambient wireless signals can be measured and then a timeout interval adjusted downwards when there are more such signals. In addition to geo-location, a check-in of a wireless device to certain location can indicate the number and type of nearby venues. If those venues are considered havens for theft, then timeouts can be adjusted downward. A user can tag specific locations as being more risky, or less risky, than others. Audio noise measured through a cellular phone's microphone can also be used to determine whether an area is crowded with people and timeouts can be adjusted. In addition to or alternatively, a ringtone of a mobile phone can be adjusted based on the risk it senses.

In some applications, an identity badge and a mobile device can be linked so that mobile device can adjust its timeout settings based on its distance from the badge. If an employee leaves his or her mobile device on a desk and walks away, it can shrink its timeout interval based on a lack of response from a radio frequency identification (RFID) tag in the badge.

Embodiments of the present invention relate to a method for securing a mobile device. The method includes measuring a number of distinct, ambient wireless signals or strength of ambient wireless signals near a mobile device, determining a risk of theft of the mobile device based on the measurement, and setting a timeout time for the device based on the determined risk.

The method can include determining a number of wireless hotspots available, identifying nearby venues based on a check-in of the device to a particular geographic location, and/or looking up crime statistics for a particular geographic location in order to determine the relevant risk. A ringtone can be altered in a cellular phone based on the risk.

An embodiment relates to a method for securing a mobile device. The method includes measuring an existence of or a strength of a signal from a radio frequency identification (RFID) tag, determining a risk of theft of the mobile device based on the measurement, and setting a timeout time for the device based on the determined risk.

The RFID tag can be embedded inside or otherwise connected with a badge. Other wirelessly activated tags are envisioned.

An embodiment relates to a badge system, including a badge having a radio frequency identification (RFID) tag and a machine-readable tangible storage medium embodying information indicative of instructions for causing one or more machines to perform operations. The operations include measuring an existence of or a strength of a signal from the RFID tag, determining a risk of theft of the mobile device based on the measurement, and setting a timeout time for the device based on the determined risk.

DETAILED DESCRIPTION

Figure 1:
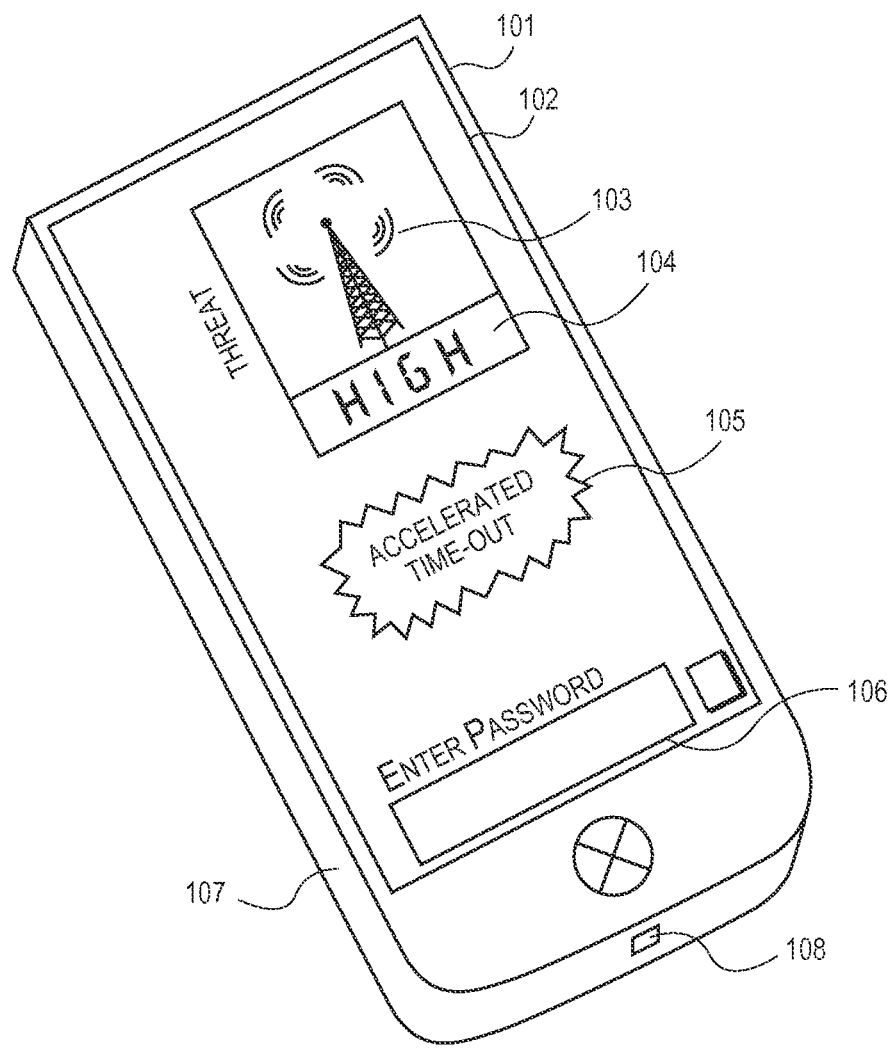
FIG. 1 illustrates an accelerated time-out of a smart phone in accordance with an embodiment.

Generally, methods, devices, and systems are disclosed for altering a mobile electronic device's display timeout interval based on measurements at or of the location of the mobile device. The intensity, quality, and/or number of ambient wireless signals can be measured to determine a risk for a particular area. A timeout period for the device can be adjusted upward for low risk areas (e.g., at home in the suburbs) or adjusted downward for high risk areas (e.g., in a crowded urban plaza). The geographic location of a device can be determined using an embedded global positioning system (GPS) antenna and associated circuitry and/or auxiliary sensors, such as accelerometers.

A check-in of the device to a location-based social networking web site, such as the Foursquare® web site, can be used to determine what venue(s) the device is nearby. If the nearby venue(s) are statistically crime-ridden, known by others as risky, have been identified has having a crowd (such as having large number of people who have checked-in or receiving an identifier for a crowd, such as a badge), or tagged by the user or his friends as risky, then a timeout on the device can be automatically adjusted accordingly. A check-in may be performed by operations that include a GPS request, scanning a code with a camera, selecting a location on a map using geocoding, audio information (such as a concert) and/or a manual selection of a venue from a list. Subsystems that aid in check-in may be monitored such that the information is reported to the social networking website and a smart phone locking subsystem. The monitoring may include accesses to a library, such as a visual scanning library used to scan codes. In some embodiments, geocoding and/or reverse geocoding may be used to convert coordinates to a venue. In other embodiments, a location-based social networking site may report check-ins to the mobile device.

Audio noise, measured through a microphone operatively connected with the device, can be used to determine if the device is in the midst of a crowd. When there are more people around, generally there exists a greater risk of theft. Thus, a timeout on the device can be adjusted accordingly.

Some places like work or home have less risk of theft than at, for example, industry conferences, which can be crawling with direct competitors. At places of less risk, the frequent entering of the security password becomes a nuisance. However at places of high risk, such as conferences, a 30 second timeout may be critical and extremely helpful to prevent information from falling in to the wrong hands.

In the prior art, a simple use case of securing a device could enable an auto-lockout to kick in within a few seconds of the last action. While secure, in the sense that it would be highly unlikely for a device which has been dropped or lost to be compromised since the auto-lockout would have kicked in, the primary owner would find such behavior a nuisance—and hinder typical use. Because of this, many users have lockout timeouts that are fairly lengthy. However, with the increased length of the idle-detection, the risk increases.

An embodiment enables a user to automatically set timeouts based on the context of the environment, the context provided by its geographic location. A user at work may feel fairly comfortable about a medium length timeout. When the user is at home, the auto-lockout timeout may be significantly longer. However, when the user goes from the workplace to lunch, or on a business trip, the invention can automatically, without immediate human intervention, change the default timeout to a setting more appropriate to the risk being posed.

A setting screen can be utilized that enables a user to set the geographic location, radius or bounding box, and auto-lockout timing. For corporate-owned devices, a central IT department can push known, established locations (e.g., a campus comprised of multiple buildings with parking lots and open space in-between) to devices. The setting screen can enable multiple environments to be created and managed.

An example of settings for a mobile device used within a corporate environment may include:

1. "Building A", defined by a geographic bounding box of the tuple: (min-latitude, min-longitude), (max-latitude, max-longitude), auto-lock timeout: 15-minutes 2. "Building B", defined by a geographic bounding box of the tuple: (min-latitude, min-longitude), (max-latitude, max-longitude), auto-lock timeout: 15-minutes 3. "Building C", defined by a geographic bounding box of the tuple: (min-latitude, min-longitude), (max-latitude, max-longitude), auto-lock timeout: 15-minutes 4. "Home", defined by a geographic center and radius of (central-latitude, central-longitude, 40 meters), auto-lockout timeout: 1 hour 5. "Elsewhere", defined as not falling in to one of the above areas, auto-lockout timeout: 30 seconds.

Timeouts can be triggered by a rule affected by the geolocation. If a mobile device were in the "Home" environment, idle for 20 minutes, and moved outside the radius (and assuming that the work environments defined by Buildings A-C are not overlapping), the "Elsewhere" ruleset can kick in and calculate that the time since idle has exceeded the 30-seconds, and thus instantaneously auto-lock. An indicator of the mobile device may, such as an indicator light, may display an indication of the current ruleset. For example, a "Home" ruleset may use a solid green light, while an "Elsewhere" ruleset may cause the indicator to flash red.

In some embodiments, once locked, moving back in to a different zone does not "un-lock" the device, even if the rule determines that it would have remained unlocked. One reason for this behavior is to increase security and deter a potential scenario where a lost device is found shortly after exiting the pre-defined area, and slightly outside the pre-set area.

It can also be assumed that the locked state also prohibits access to the settings screen, including the portions that enable the creation and management of new zones in the context of this invention.

Considerations can also be given to people who may occupy spaces at or near the edge of the defined boundary. Geographic positioning technologies, while accurate in most cases can sometimes drift or reflect a position slightly outside the person's real location. A person sitting in a corner office may find it annoying if the location temporarily jumps outside the corporate building, e.g., "Building A", and the ruleset "Elsewhere" when the 30-second auto-lock kicks in. To assist in this scenario, a geographic positioning location may be augmented by dead-reckoning technologies, such as accelerometers, to provide an effective "location," with the centroid reflecting the actual position.

An example of dead-reckoning assistance is:

1. A person sits in a corner office in "Building A" in a corporate environment.
2. GPS technology is used to determine the location.
3. An accelerometer on board the device detects that the device has not moved.
4. GPS locations constantly accumulate, and a centroid is calculated.
5. At times, the instantaneous GPS location reading may reflect that the position is outside the "Building A" bounding box, however, based on the accumulated GPS centroid location, and information that the device has not been moved enough (based on integrating the accelerometer readings), the final determined location remains at the centroid, and therefore, we enable this user to reap the convenience benefits of working in the "Building A" environment, with the full timeout of 15-minutes.

Technical advantages of embodiments of the invention are many. Existing sensors, such as a radio frequency (RF) antenna and audio microphone on a mobile phone, can be used to determine whether a device is in a populous area. Such areas are often associated with higher risk levels of theft; therefore, a timeout interval on a device can be automatically adjusted accordingly. In conjunction with such on-board sensors, off-board data, such as local crime statistics and user tagging, can be used to modify the risk. A ringtone of a phone can indicate to the user the risk level of theft that a phone determines it is being subjected. This feedback can inform the user to protect the device as well as other belongings in instances where the user may have forgotten about such risks. IT departments can customize geographic areas of risk for a company and then push those area definitions out to users so that users do not have to enter them separately. In some instances, feedback provided to a user in the form of a shorter timeout can inform the user that he or she is in a risky area, according to a corporate IT department. In addition, a user may be encouraged to leave his or her mobile device safely at the office instead of carrying it with him or her on personal errands because the device's accelerated timeout makes it less usable, more inconvenient in other areas.

In one embodiment, detected accelerations may be used to determine a risk of theft of a mobile device. A brief acceleration at the speed of gravity followed by a more sudden jolt can imply that a mobile device has been dropped. A sudden jolt or stop may include 200 or more times the force and/or acceleration of gravity. Using these acceleration events, the mobile device sets a time out on its determination of whether a fall has occurred or not. In one embodiment, a history of accelerations and/or timeframes of accelerations may be tracked. For example, the mobile device can determine that everyday between 6 pm and 7 pm, it receives a similar acceleration event. This event may be tied to the fact that a user drops the mobile device in a basket every day upon a return home. Thus, a repeated event may not trigger a decrease in time out time. In some embodiments, the acceleration events may be classified into different types of events. For example, an acceleration even may be classified into a controlled event or an uncontrolled event. A controlled event may include a placement of a device onto a hard surface where rotation and/or bounce are constrained. An uncontrolled event may include a fall with a bounce and/or rotation that is not consistent with a placement.

The risk of theft and/or time out time may be calculated internally or externally. In some embodiments, a mobile device may provide services necessary to calculate a risk of theft and determine a time out time. In other embodiments, the mobile device may request updates to information, such as from an IT department on risk assessment, updated time out times for different risk levels and/or equation information for determining risk and/or time out times. In one embodiment, a mobile device may request information about a location or venue, such as crime statistics, to include in the calculation. In some embodiments, the mobile device may collect information and send the information to a remote server system to process and return a time out.

FIG. 1 illustrates an accelerated time-out of a smart phone in accordance with an embodiment. Smart phone 101 includes display 102, which is locked. In screen area 105, display 102 highlights to the user that the lock was accelerated. In area 104, display 102 informs the user that the risk of theft is "HIGH," and in area 103, the display shows the user that a large number of distinct, ambient wireless signals is to blame for the determination that it is in a risky area.

For example, the smart phone counts 30 different wireless hotspots and cellular tower channels being used with its embedded antenna 107. Because it is in the midst of this large number of signals, it determines that it is in an urban environment where there is more of a risk of it being stolen. The smart phone accelerates its time-out interval from a default of 5 minutes to a quick 30 seconds before locking.

Smart phone 101 can differentiate between known wireless signals and unknown wireless signals. A known wireless signal, such those emitted from a wireless access point at home or other family cell phones, can be detected and the risk assessment decreased. Upon detecting a recognized signal, such as from an identifier like a media access control address, the smart phone may decrease its time-out interval from a default 5 minutes to 20 minutes before locking.

Smart phone 101 can use accelerometer 108 to further refine its risk assessment. If it is determined that the phone has fallen (out of a user's pocket), then is may be deemed more likely that it is lost. Therefore, the timeout can be adjusted accordingly.

Smart phone 101 can use a user entry to further refine its risk assessment. A user may indicate that he or she intends to stay at a certain location (e.g. a concert) for 2 hours. If the phone is removed from the venue before the expiration of the 2 hours, then there is a higher risk that the phone has been stolen. The timeout can be adjusted accordingly.

To re-initiate full interaction with the device, a user is prompted in area 106 of the display to (re-)enter his or her password. A biometric reader can be used in conjunction with or instead of a password.

A "distinct" wireless signal includes a radio frequency signal that is on a different frequency, band, spectrum, channel, or other communication protocol as known in the art than another wireless signal.

"Ambient" wireless signals include those signals that exist in a certain location at a certain point in time.

Figure 2:
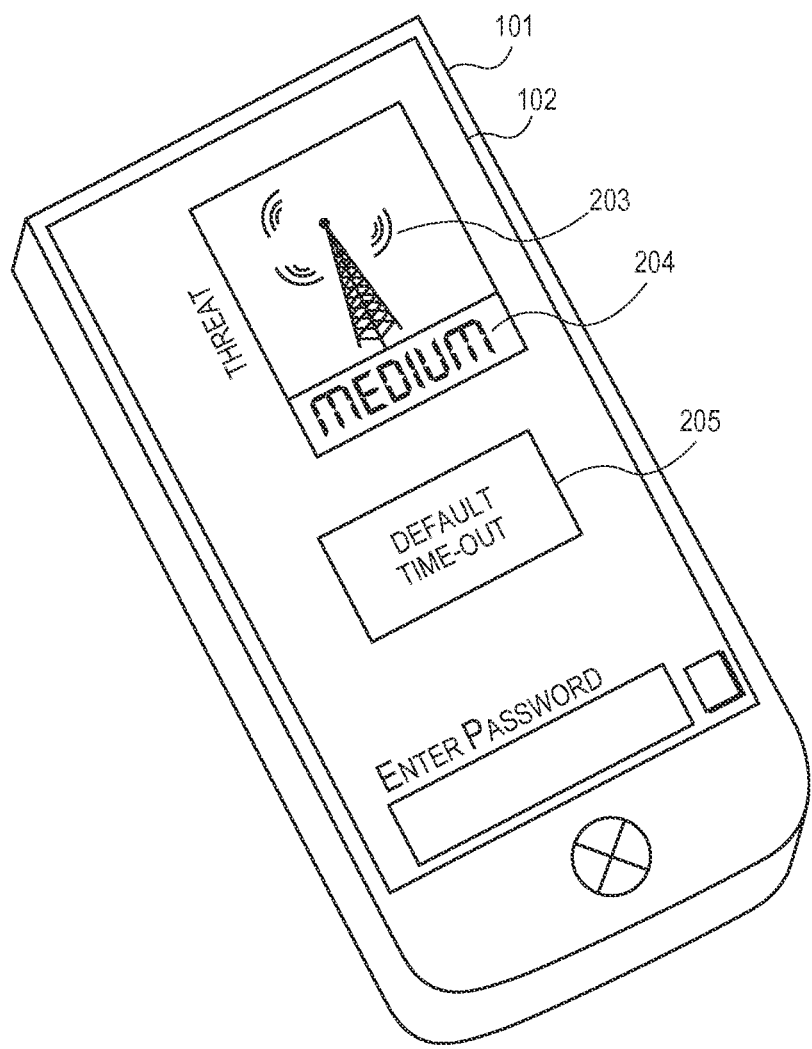
FIG. 2 illustrates a default time-out of a smart phone in accordance with an embodiment.

FIG. 2 illustrates a default time-out of a smart phone in accordance with an embodiment. In screen area 203, display 102 shows the user that a moderate number of distinct, ambient wireless signals exists in the environment such that smart phone 101 has determined that the risk is "MEDIUM" (as indicated in area 204). Area 205 indicates that the time-out was at a default setting.

For example, the smart phone counts 10 different wireless hotspots and cellular tower channels being used. Because it is in the midst of this moderate number of signals, it determines that it is in a suburban environment where there is a normal risk of it being stolen. The smart phone keeps its time-out interval at a default of 5 minutes.

Figure 3:
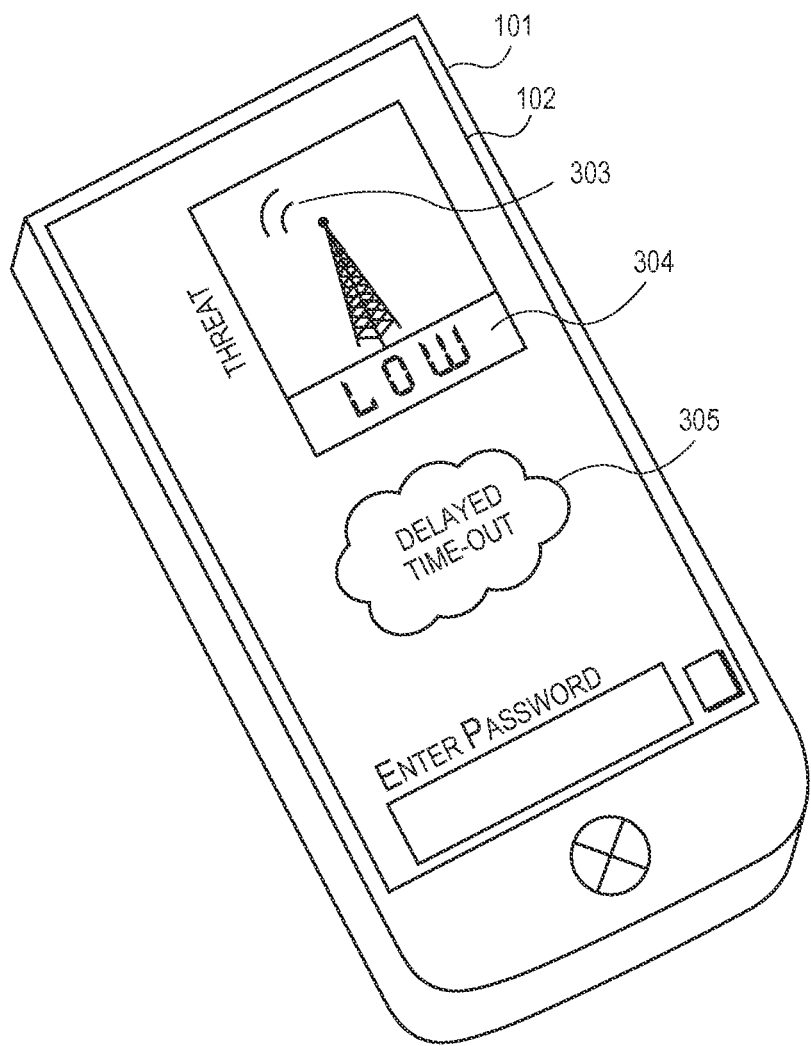
FIG. 3 illustrates a delayed time-out of a smart phone in accordance with an embodiment.

FIG. 3 illustrates a delayed time-out of a smart phone in accordance with an embodiment. In area 303, display 102 shows the user that a low number of distinct, ambient wireless signals exist in the environment such that smart phone 101 has determined that the risk is "LOW" (as indicate in area 304). Area 305 indicates that the time-out was delayed from its default setting.

For example, the smart phone counts 1 wireless signal (its own) for communication with a cellular tower. Because there are no other devices, and probably few other people around, it determines that it is in a rural environment where there is a low risk of it being stolen. The smart phone extends its time-out interval to 30 minutes from a default of 5 minutes.

In another embodiment, a smart-phone may increase determined risk when a detected signal strength indicates a wireless device is within inches of another wireless device. For example, a smart phone may be pick-pocketed from an unsuspecting owner. Because the smart phone is placed in a pocket with a second wireless phone, the smart phone may detect the strong signal strength of the second wireless phone, which is above a threshold, and immediately lock the device because of the determined risk.

Figure 4:
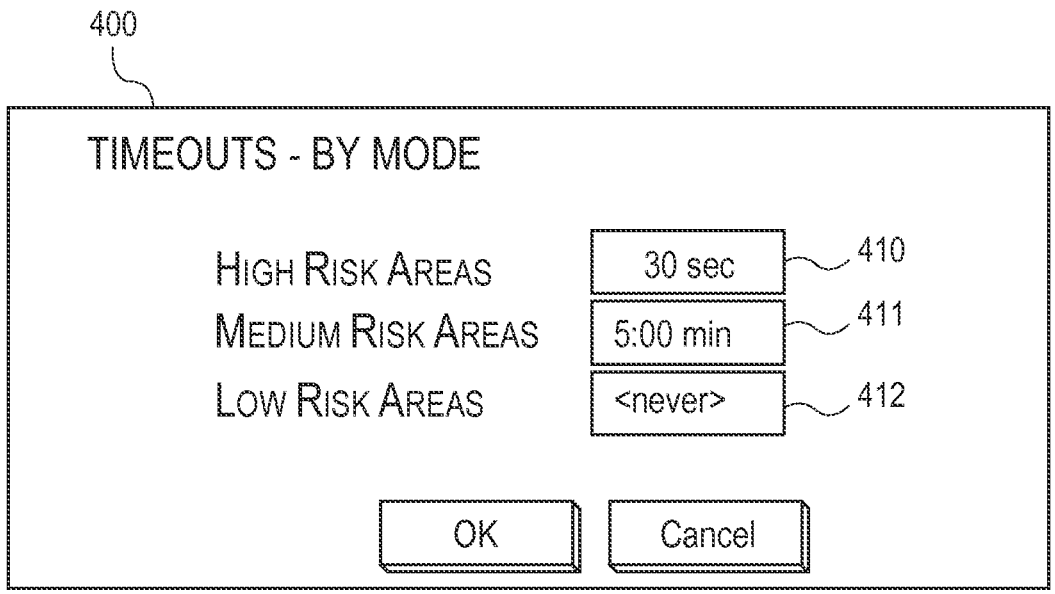
FIG. 4 illustrates a time-out setting interface for distinct risk modes in accordance with an embodiment.

FIG. 4 illustrates a time-out setting interface for distinct risk modes in accordance with an embodiment. In field 410 of interface 400, a user can set the time-out period for the device when the device is in a high risk area. In this case, the setting is at 30 seconds. In field 411, a user can set the time-out period for the device when it is in a medium risk area. In this case, the setting is at 5 minutes. In field 412, a user can set the time-out period for the device when it is in a low risk area. The user has set this to "NEVER," so that a time-out is indefinitely postponed (while in the low risk area). In some embodiments, distinct risk modes can be replaced with continuously variable risk determinations.

Figure 5:
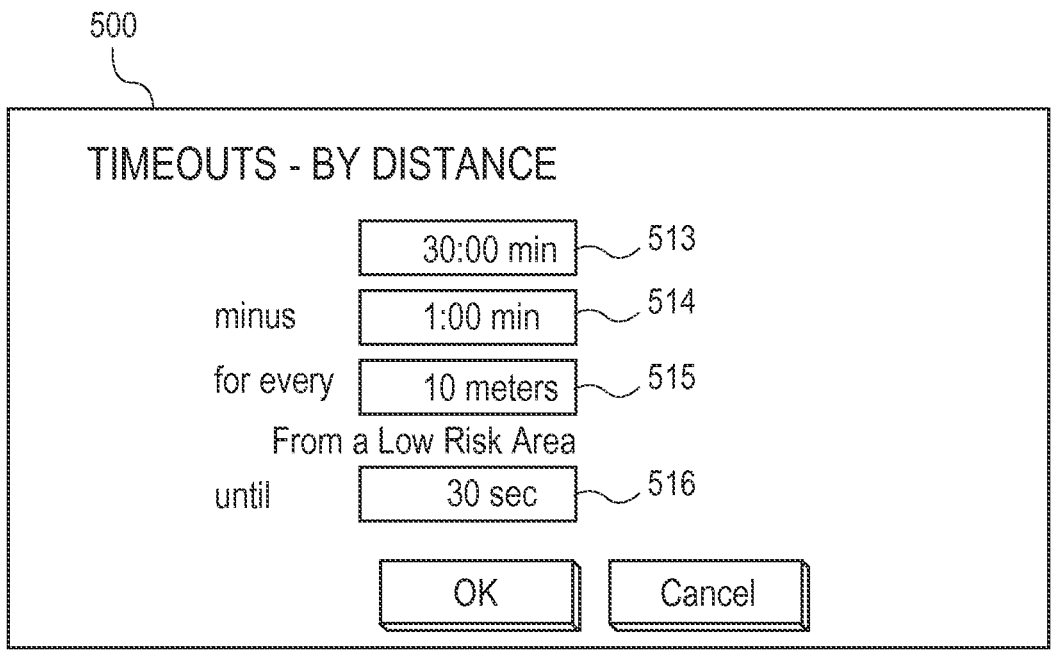
FIG. 5 illustrates a time-out setting interface for risk associated with distances in accordance with an embodiment.

FIG. 5 illustrates a time-out setting interface for distances in accordance with an embodiment. In field 513 of interface 500, a user can set the default time-out period for the device. In this case, the default is set at 30 minutes. In field 514, a user can set an amount of time to be subtracted from the 30 minutes according to a formula. In this case, 1 minute can be subtracted. In field 515, a user can set a distance for the formula, here it being 10 meters from a low risk area. In field 516, a user can set the minimum time interval for a time-out. Here, it is set at 30 seconds.

With the settings shown, a time-out period is set at 30 minutes minus 1 minute for every 10 meters outside a low risk area, with a minimum of 30 seconds. In an example where the device is determined to be 40 meters away from a low risk area (e.g., in a park across the street from a company campus), the time-out period is set at:

$$30 \text{ minutes} - (40 \text{ meters}) \times (1 \text{ minute}/10 \text{ meters}) = 26 \text{ minutes} \quad \text{(Eqn. 1)}$$

As another example where the device is determined to be a kilometer (i.e., 1000 meters) away from a low risk area, the timeout period is set at:

$$30 \text{ minutes} - (1000 \text{ meters}) \times (1 \text{ minute}/10 \text{ meters}) = (\text{negative}) \text{ Therefore: } 30 \text{ seconds} \quad \text{(Eqn. 2)}$$

A timeout period is adjusted linearly in conjunction with the associated risk. As a person is farther away from his place of work, the risk of theft increases proportionately. In the areas immediately surrounding the person's workplace, the risk can be determined to be a linear function of distance from the workplace. The timeout period is adjusted in accordance with the risk. Other (monotonically increasing/decreasing) functions can be used for risk determination with respect to distance. For example a polynomial or exponential function can be used. A timeout can trigger if a current timeout period is exceed based on a time since a last interaction with a device. In one embodiment, once a new timeout is determined, a device may be locked if the timeout value has been exceeded. A new determined timeout period does not necessarily reset a timeout counter to zero, but can merely adjust a timeout threshold.

Figure 6:
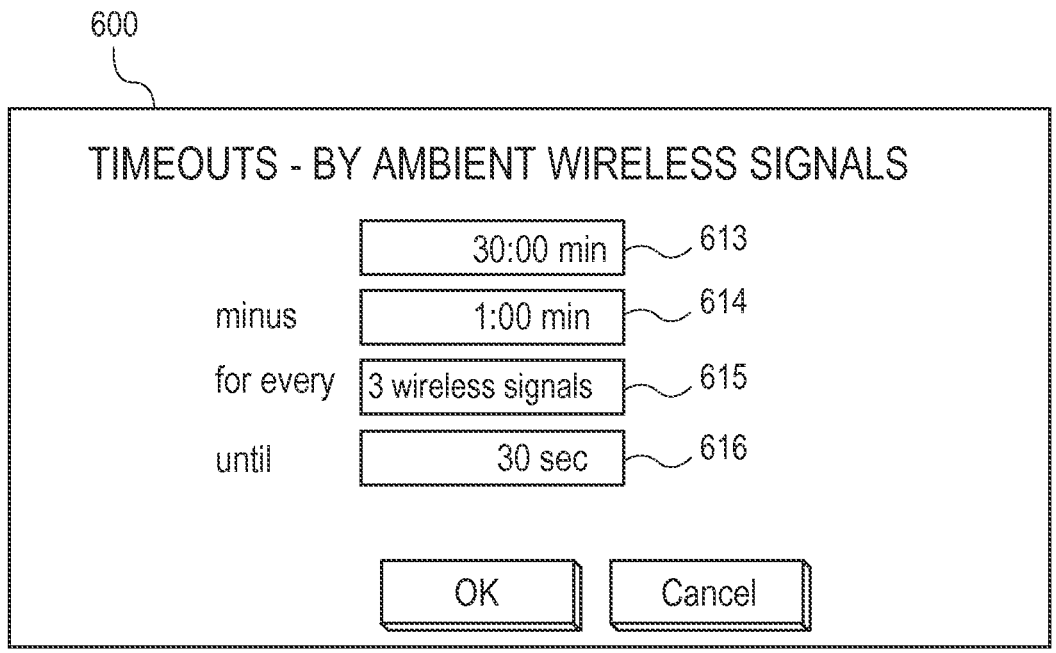
FIG. 6 illustrates a time-out setting interface for risk associated with a number of ambient wireless signals in accordance with an embodiment.

FIG. 6 illustrates a time-out setting interface for ambient wireless signals in accordance with an embodiment. In field 613 of interface 600, a user can set the default time-out period for the device. In this case, the default is set at 30 minutes. In fields 614 and 615, a user can set an amount of time to be subtracted from the 30 minutes according to a formula. In this case, 1 minute can be subtracted for every 3 wireless signals detected. In field 616, a user can set the minimum time interval for a time-out. Here, it is set at 30 seconds.

With the setting shown, a time-out period is set at 30 minutes minus 1 minute for every 3 wireless signals detected, with a minimum of 30 seconds. In an example where the device detects 22 distinct wireless signals, the time-out period is set at:

$$30 \text{ minutes} - (21 \text{ signals}) \times (1 \text{ minute}/3 \text{ signals}) = 22.7 \text{ minutes} \quad \text{(Eqn. 3)}$$

Figure 7:
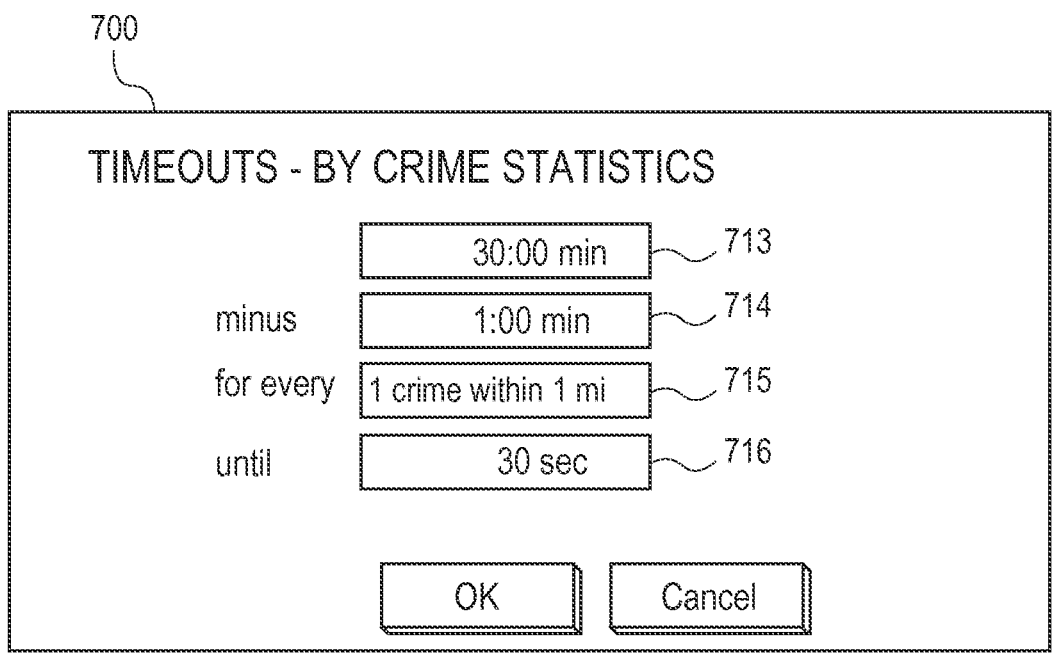
FIG. 7 illustrates a time-out setting interface for risk associated with local crime statistics in accordance with an embodiment.

FIG. 7 illustrates a time-out setting interface for local crime statistics in accordance with an embodiment. In field 713 of interface 700, a user can set the default time-out period for the device. In this case, the default is set at 30 minutes. In fields 714 and 715, a user can set an amount of time to be subtracted from the 30 minutes according to a formula. In this case, 1 minute is subtracted for every reported crime within 1 mile. In field 716, a user can set the minimum time interval for a time-out. Here, it is set at 30 seconds.

With the setting shown, a time-out period is set at 30 minutes minus 1 minute for every crime reported within 1 mile, with a minimum of 30 seconds. In an example where the device has looked up crime statistics and found 15 within a one mile radius, the time-out period is set at:

$$30 \text{ minutes} - (15 \text{ crimes}) \times (1 \text{ minute}/1 \text{ crime}) = 15 \text{ minutes} \quad \text{(Eqn. 4)}$$

Figure 8:
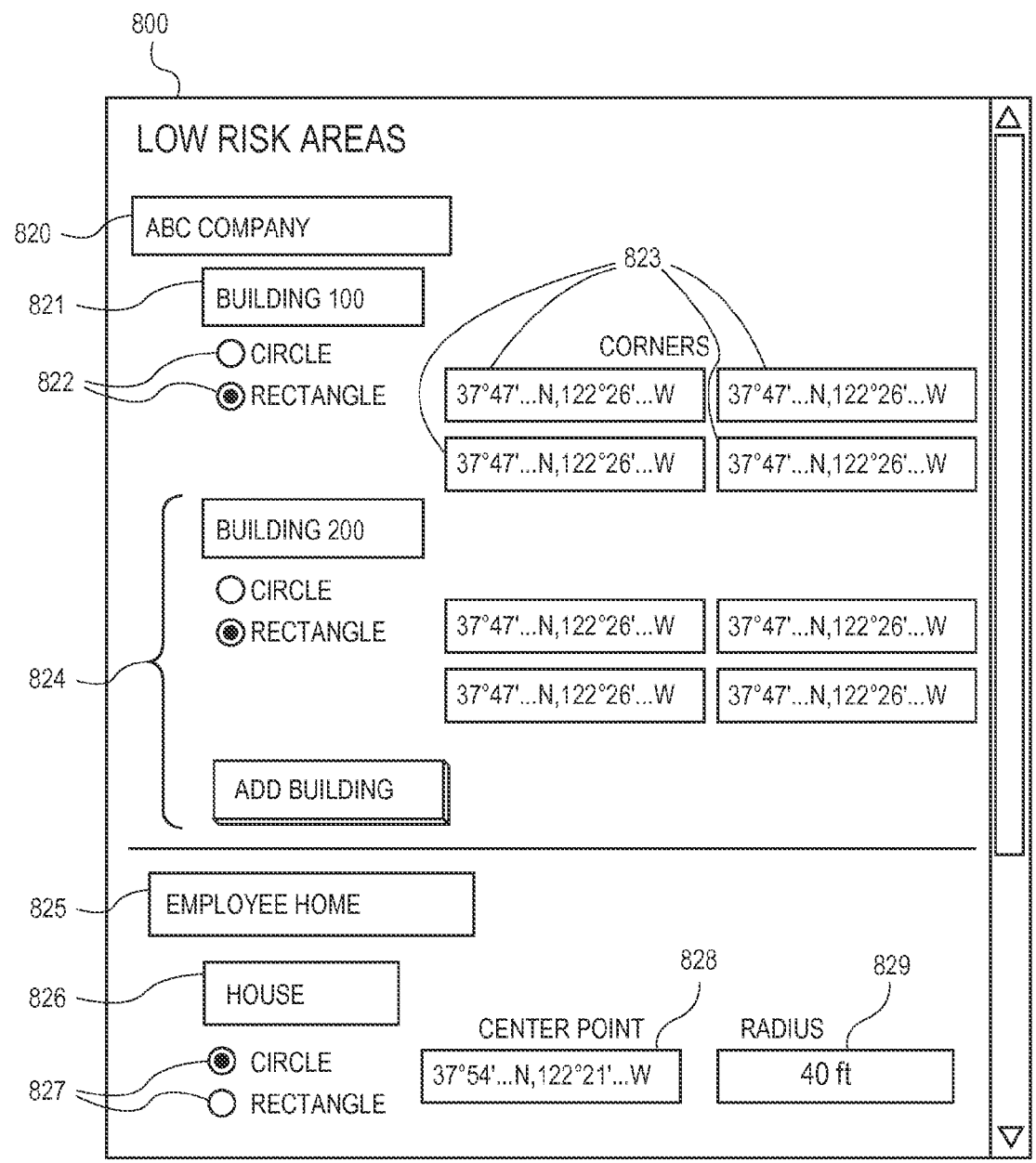
FIG. 8 illustrates an interface for entering geographic positions in accordance with an embodiment.

FIG. 8 illustrates an interface for entering geographic positions in accordance with an embodiment. In the figure, the geographic positions are defined as low risk areas.

In field 820 of interface 800, an IT department administrator can indicate a company name for the relevant company. In field 821, a bounded geographic area can be labeled; here it is labeled as "Building 100." Using radio buttons 822, the bounding system can be defined. In this case, a rectangle bounding area—or more accurately, a four-sided polygon—is selected. In fields 823, the administrator can enter four coordinates for the four points of the polygon in order to define the rectangle.

In fields 824, another building, "Building 200," is defined. Building 200 may be across the street from, cater-corner to, or far removed Building 100. In any event, the buildings can be associated with each other as one work area with the same amount of risk.

In field 825, a user may wish to label another low risk area, labeling it "Employee Home." In field 826, the user has input his house, and in field 827 he has selected a circle for the definition of his personal low risk area. In field 828, the user has entered a center point for the circle, and in field 829 he has entered a radius of the circle. That is, the low risk area for the employee's house is a circular area with the specified radius centered at the specified latitude and longitude.

Figure 9:
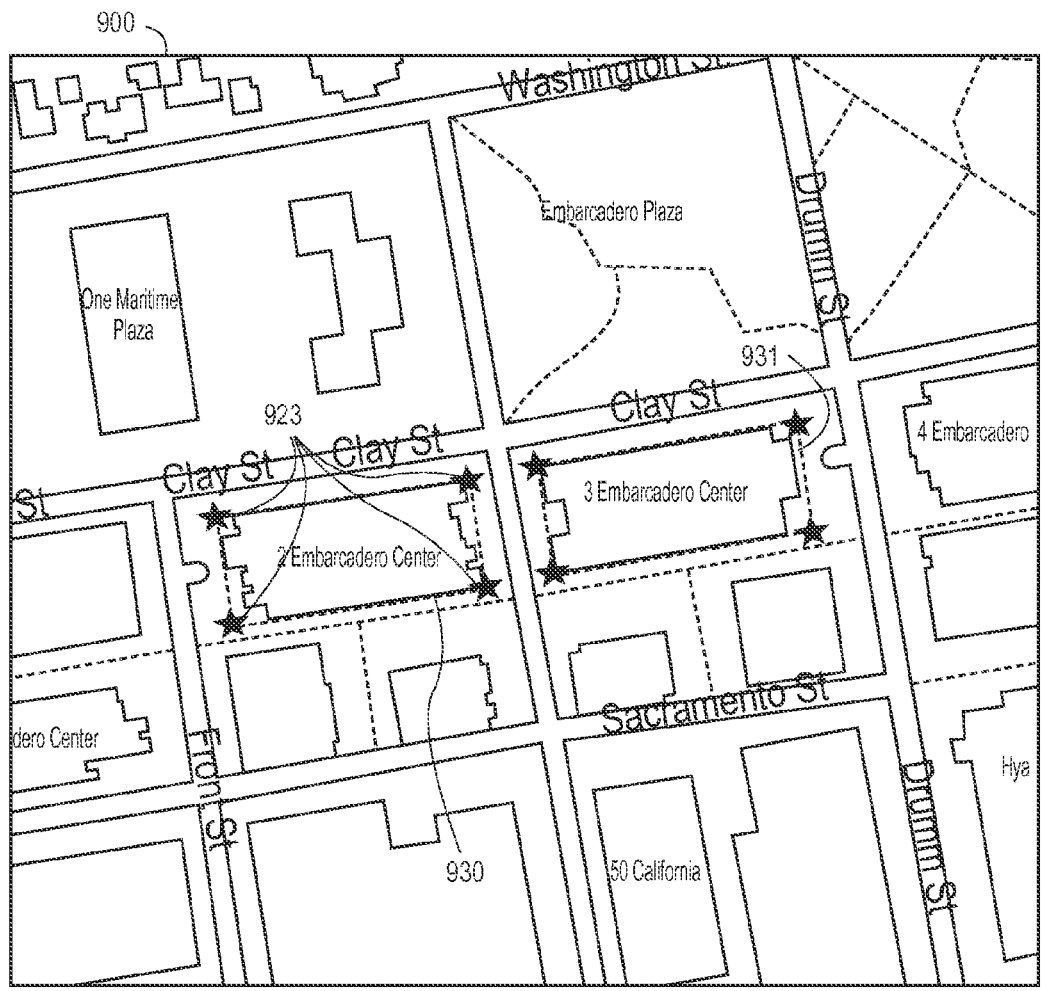
FIG. 9 illustrates a map of geographic positions for a corporate campus in accordance with an embodiment.

FIG. 9 illustrates a map of geographic positions for a corporate campus in accordance with an embodiment. Map 900 can be used to set the geographic boundaries or simply display the boundaries. Points 923 correspond to latitude/longitude coordinate fields 823 (FIG. 8). As shown, these points may or may not align with an actual corner of a building. They can be a simplified perimeter of a building, align with perimeter streets, or not align with any physical structure.

Building 100 boundary 930 and Building 200 boundary 931 can be considered one campus of a company. Within the bounds of the areas, a mobile device can consider itself in a low risk area. As one walks away from and outside the boundaries, a timeout on the mobile device can adjust itself in accordance with a distance formula, such as that in Eqn. 1.

Figure 10:
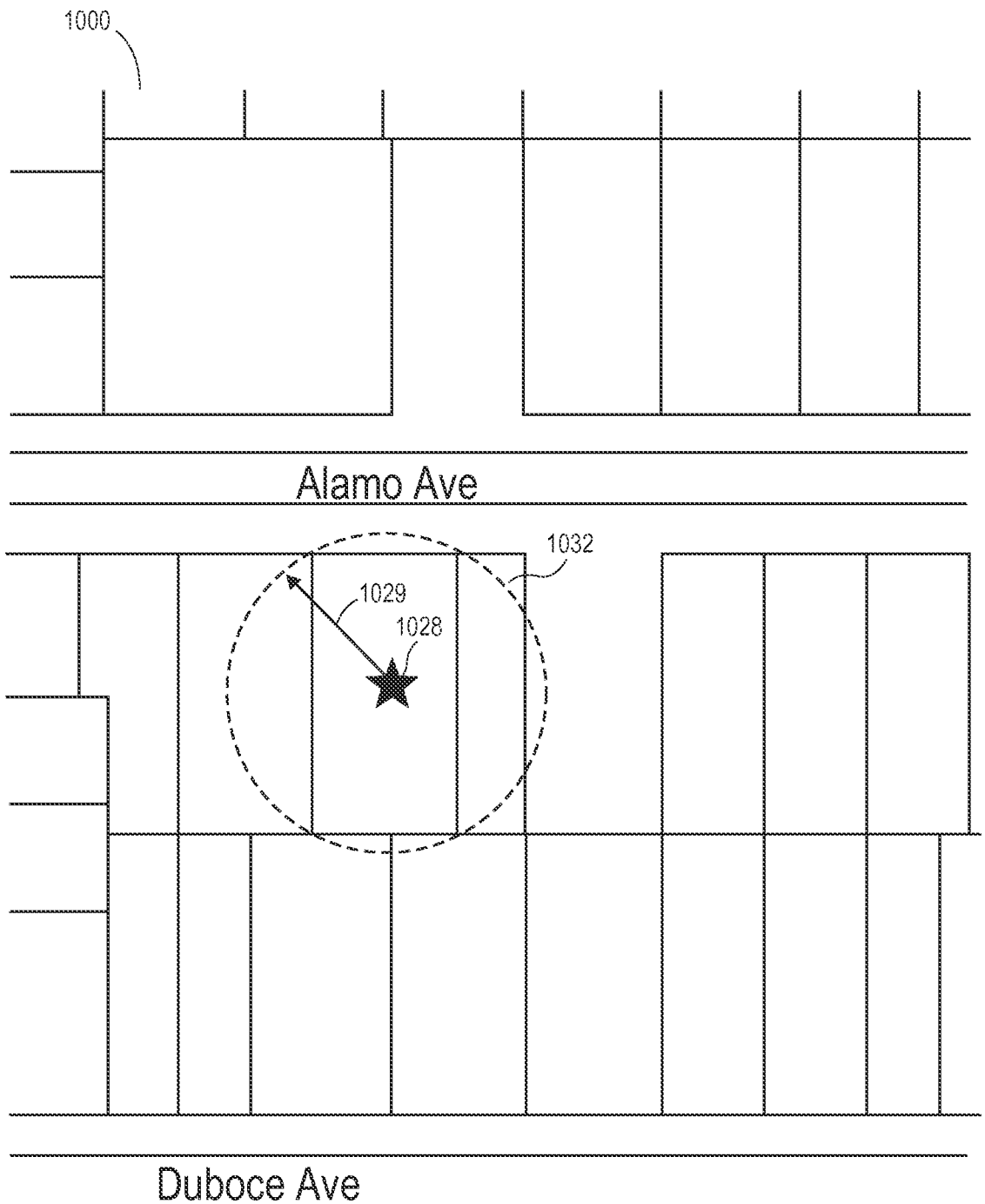
FIG. 10 illustrates a map of geographic positions for a residence in accordance with an embodiment.

FIG. 10 illustrates a map of geographic positions for a residence in accordance with an embodiment. In map 1000, geographic area 1032 is defined by center point 1028 (as entered in center point field 828 of FIG. 8) and radius 1029 (as entered in radius field 829 of FIG. 8). In the figure, the circle is centered in the residential property and its circumference intercepts the four corners of the property. As in the rectangular boundary examples, the circular boundaries do not need to align with physical features.

Although the embodiments shown are for defining low risk areas, high risk (and medium risk) areas can be defined in the same way.

Figure 11:
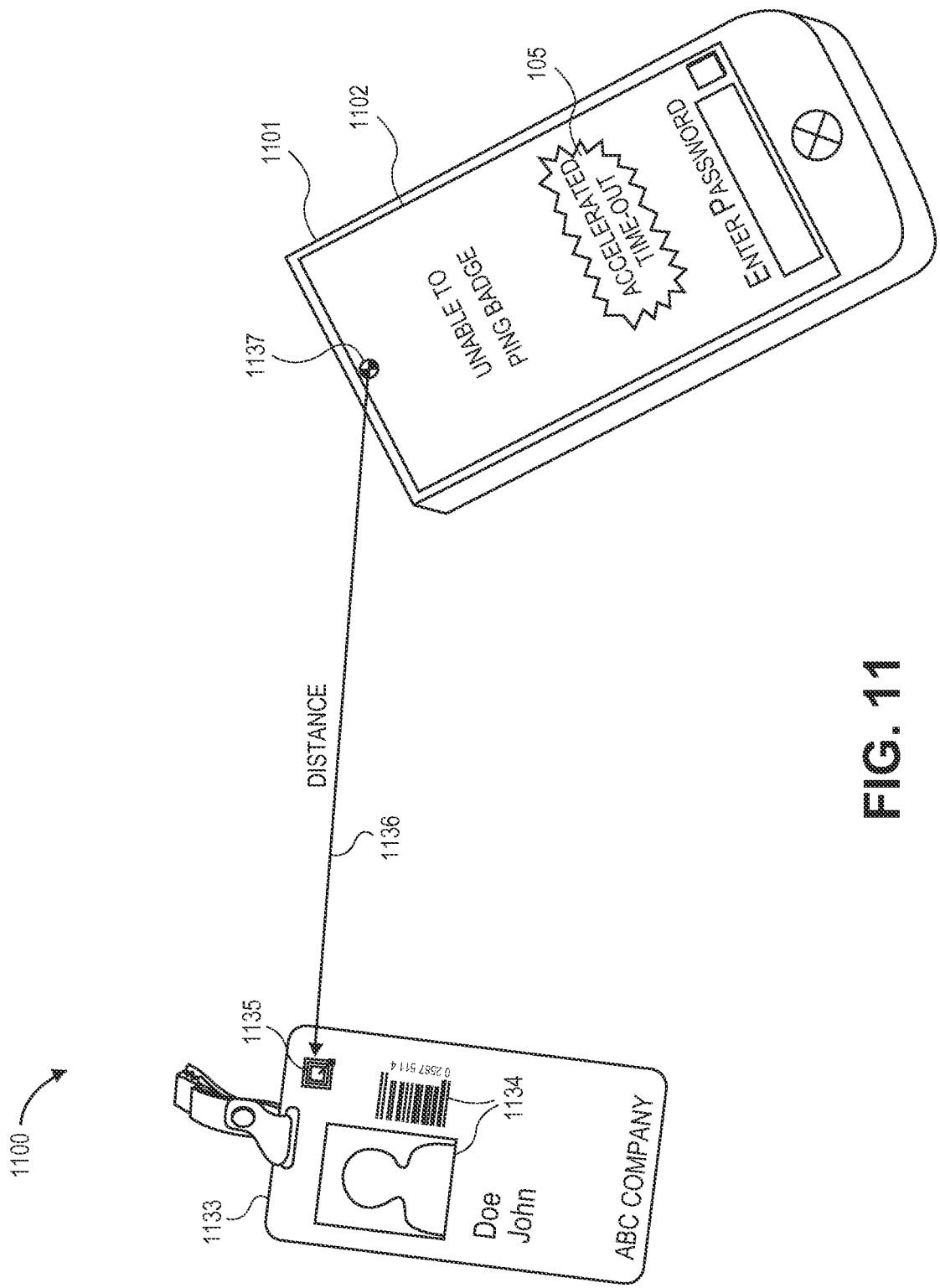
FIG. 11 illustrates a badge distance determination in accordance with an embodiment.

FIG. 11 illustrates a badge distance determination in accordance with an embodiment. System 1100 comprises badge 1133 and mobile device 1101, or the software installed thereon. Badge 1133 has elements 1134 that identify the badge owner, such as a photo, name, and barcode, as well as radio frequency identification (RFID) chip 1135.

Mobile device 1101 has display 1102 and RFID reader sensor 1137. RFID reader sensor 1137 interrogates RFID tag 1135 by 'pinging' a predefined (set of) frequencies and listening for a response from the tag. If distance 1136 is determined to be greater than a threshold (e.g., 20 feet), or if a ping results in no response from RFID tag 1135, then mobile device 1101 enters an accelerated time-out. This result is displayed to the user in area 1105 on display 1102.

In another embodiment, an external device is used to add risk detection functionality to a mobile device 1101. For example, a signal counter and antenna is included in a badge 1133, bracelet or other wearable item. The signal counter and antenna is used to augment the risk detection of the mobile device by counting, identifying and/or detecting a strength of wireless signals in the area. The augmented functionality is reported back to the mobile device 1101. Using the reported number of signals, identified signals and/or strength of signals, the mobile device may determine an appropriate timeout. The signals can also be categorized. In one embodiment, signals are categorized as safe signals, which may include such signals as those produced by known private routers. Signals can be categorized as more dangerous signals, such as public wireless hotspots or unknown cellular phone signals.

Figure 12:
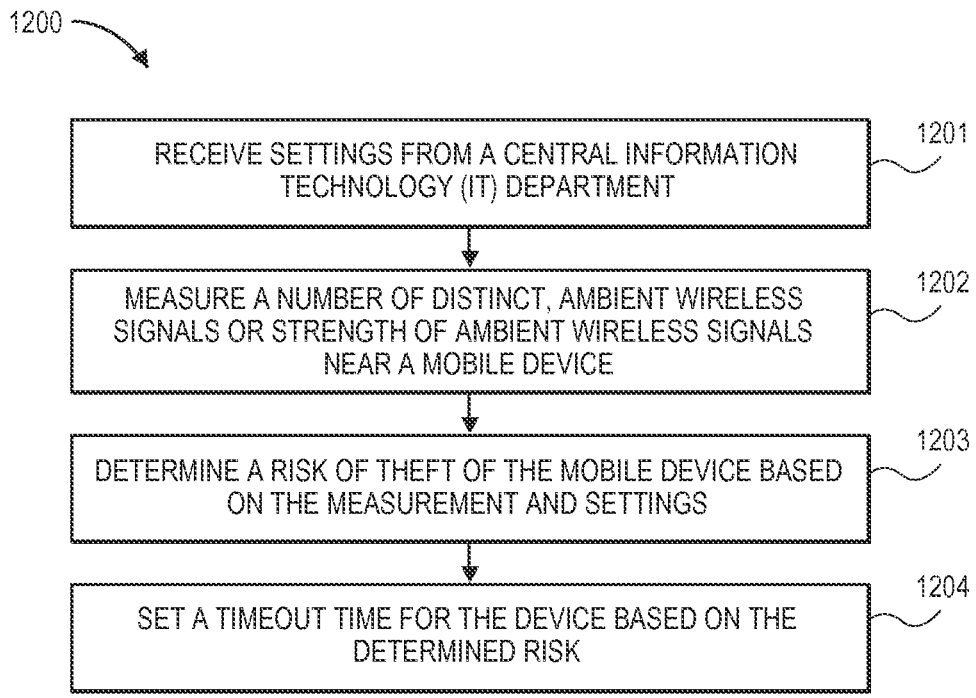
FIG. 12 is a flowchart of a process in accordance with an embodiment.

FIG. 12 is a flowchart illustrating process 1200 in accordance with an embodiment. In operation 1201, settings are received from a central information technology (IT) department of a business organization. In operation 1202, a number of distinct, ambient wireless signals, or the strength of ambient wireless signals near a mobile device, are measured. In operation 1203, a risk of theft of the mobile device is determined based on the measurement and the settings. In operation 1204, a timeout time for the device is set based on the determined risk.

Figure 13:
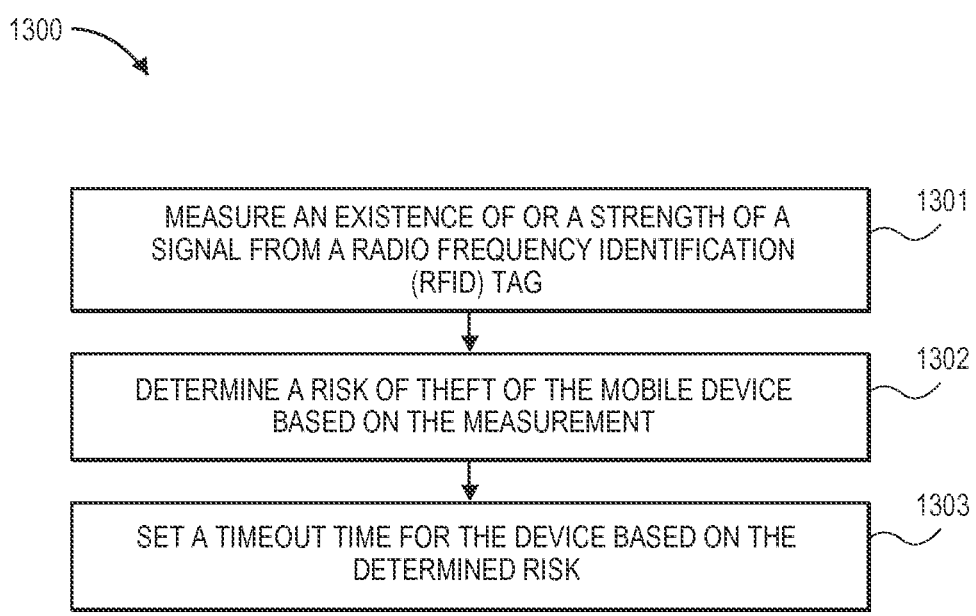
FIG. 13 is a flowchart of a process in accordance with an embodiment.

FIG. 13 is a flowchart illustrating process 1300 in accordance with an embodiment. In operation 1301, an existence of or a strength of a signal from a radio frequency identification (RFID) tag is measured. In operation 1302, a risk of theft of the mobile device is determined based on the measurement. In operation 1303, a timeout time is set for the device based on the determined risk.

The operations may be performed in the sequence given above or in different orders as applicable. They can be automated in a computer or other machine and can be coded in software, firmware, or hard coded as machine-readable instructions and run through one or more processors that can implement the instructions.

Figure 14:
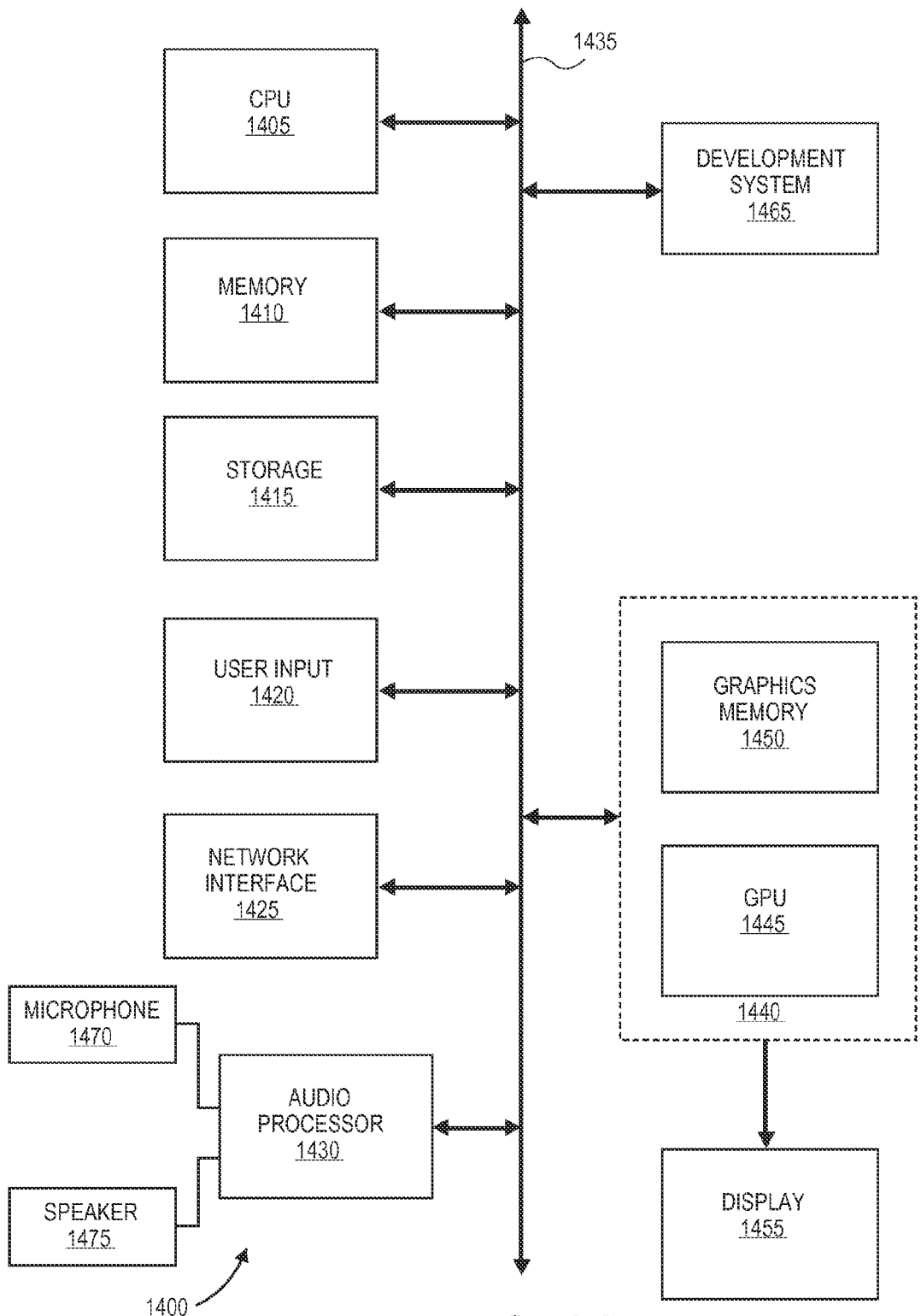
FIG. 14 illustrates a computer system suitable for implementing an embodiment.

FIG. 14 illustrates an example of a hardware system suitable for implementing a device in accordance with various embodiments. This block diagram illustrates a computer system 1400, such as a personal computer, video game console and associated display, mobile device, personal digital assistant, or other digital device, suitable for practicing embodiments of the invention. Computer system 1400 includes a central processing unit (CPU) 1405 for running software applications and optionally an operating system. CPU 1405 may be made up of one or more homogeneous or heterogeneous processing cores. Memory 1410 stores applications and data for use by the CPU 1405. Storage 1415 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1420 communicate user inputs from one or more users to the computer system 1400, examples of which may include keyboards, mice, joysticks, touch pads, touch screens, still or video cameras, and/or microphones. Network interface 1425 allows computer system 1400 to communicate with other computer systems via an electronic communications network, and may include wired or wireless communication over local area networks and wide area networks such as the Internet. An audio processor 1430 is adapted to generate analog or digital audio output from instructions and/or data provided by the CPU 1405, memory 1410, and/or storage 1415. The audio processor 1430 may be connected to inputs, such as microphone 1470, and outputs, such as speaker 1475. The components of computer system 1400, including CPU 1405, memory 1410, data storage 1415, user input devices 1420, network interface 1425, and audio processor 1430 are connected via one or more data buses 1435. Audio processor 1430 is connected with microphone 1470.

A graphics subsystem 1440 is further connected with data bus 1435 and the components of the computer system 1400. The graphics subsystem 1440 includes a graphics processing unit (GPU) 1445 and graphics memory 1450. Graphics memory 1450 includes a display memory (e.g., a frame buffer) used for storing pixel data for each pixel of an output image. Graphics memory 1450 can be integrated in the same device as GPU 1445, connected as a separate device with GPU 1445, and/or implemented within memory 1410. Pixel data can be provided to graphics memory 1450 directly from the CPU 1405. Alternatively, CPU 1405 provides the GPU 1445 with data and/or instructions defining the desired output images, from which the GPU 1445 generates the pixel data of one or more output images. The data and/or instructions defining the desired output images can be stored in memory 1410 and/or graphics memory 1450. In an embodiment, the GPU 1445 includes 3D rendering capabilities for generating pixel data for output images from instructions and data defining the geometry, lighting, shading, texturing, motion, and/or camera parameters for a scene. The GPU 1445 can further include one or more programmable execution units capable of executing shader programs.

The graphics subsystem 1440 periodically outputs pixel data for an image from graphics memory 1450 to be displayed on display device 1455. Display device 1455 can be any device capable of displaying visual information in response to a signal from the computer system 1400, including CRT, LCD, plasma, and OLED displays. Computer system 1400 can provide the display device 1455 with an analog or digital signal.

In accordance with various embodiments, CPU 1405 is one or more general-purpose microprocessors having one or more processing cores. Further embodiments can be implemented using one or more CPUs 1405 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:
1. A computer-implemented method for locking a device, comprising:
    detecting, by a mobile device, ambient wireless signals;
    determining a number of wireless devices associated with the wireless signals;

determining one or more venues nearby to the mobile device;

determining a first timeout time for the mobile device based at least in part on the determined number of wireless devices and the one or more venues nearby to the mobile device;

detecting a change in the number of wireless devices associated with the wireless signals; and determining an updated timeout time for the mobile device based at least in part on the change in the number of wireless devices.

2. The computer-implemented method of claim 1 further comprising setting a ringtone based at least in part on the updated timeout time.

3. The computer-implemented method of claim 1 further comprising:

determining information derived from a number of people who have checked-in to a venue of the one or more venues, wherein the venue is associated with a location of the mobile device; and including the derived information in the determination of the timeout times.

4. The computer-implemented method of claim 1, wherein the determined one or more venues nearby to the mobile device are each associated with a risk of theft of the mobile device.

5. The computer-implemented method of claim 1 further comprising downloading information technology settings, the information technology settings providing settings for the determining of time-out times.

6. The computer-implemented method of claim 1, wherein the detecting of the ambient wireless signals includes determining a number of wireless hotspots available.

7. The computer-implemented method of claim 1, further comprising:

identifying one or more known wireless signals; and decreasing the first timeout time based at least in part on the known wireless signals.

8. The computer-implemented method of claim 1, wherein the detecting of the change in the number of wireless devices associated with the wireless signals includes detecting a decrease in the number of wireless devices associated with the wireless signals, and wherein the updated timeout time is greater than the first timeout time.

9. The computer-implemented method of claim 1, wherein the detecting of the change in the number of wireless devices associated with the wireless signals includes detecting an increase in the number of wireless devices associated with the wireless signals, and wherein the updated timeout time is less than the first timeout time.

10. The computer-implemented method of claim 1, wherein the ambient wireless signals are received from external to the mobile device.

11. The computer-implemented method of claim 1, wherein the number of detected wireless signals is representative of a risk of theft of the mobile device.

12. One or more nontransitory computer-readable storage media having collectively stored thereon executable instructions that, when executed by one or more processors of a computer system, cause the computer system to at least:

detect ambient wireless signals;

determine a number of wireless devices associated with the wireless signals;

determine one or more venues nearby to the mobile device;

determine a first timeout time based at least in part on the determined number of wireless devices and the one or more venues nearby to the mobile device;

detect a change in the number of wireless devices associated with the wireless signals; and determine an updated timeout time for the mobile device based at least in part on the change in the number of wireless devices.

13. The computer readable storage media of claim 12, further comprising instructions that, when executed by one or more processors of a computer system, cause the computer system to at least:

monitor use of a location determination system; and report a determined location from the location determination system to a risk assessment system.

14. The computer readable storage media of claim 13, wherein the monitoring of the use of the location determination system includes monitoring the use of a visual scanning subsystem.

15. The computer readable storage media of claim 14, wherein the monitoring of the use of the visual scanning subsystem includes monitoring a call to a visual scanning library.

16. The computer readable storage media of claim 12, wherein calculating a timeout time includes reporting a location of one or more of the wireless devices to a remote server system and receiving timeout time from the remote server system.

17. The computer readable storage media of claim 12, wherein the number of detected wireless signals is representative of a risk of theft of the mobile device.

18. A mobile device locking system for a mobile device, comprising:

an antenna configured to receive ambient wireless signals;

a signal counter in communication with the antenna, the signal counter configured to determine a number of distinct ambient wireless signals and configured to determine a change in the number of distinct ambient wireless signals; and a lockout subsystem configured to determine a timeout time based at least in part on the number of distinct ambient wireless signals and one or more venues that are determined to be nearby to the mobile device, and configured to change the timeout time based at least in part on the change in the number of distinct ambient wireless signals.

19. The mobile device of claim 18, wherein the antenna and signal counter are located within the mobile device.

20. The mobile device of claim 18, wherein the antenna and signal counter are located external to the mobile device.

* * * * *